UNITED STATES PATENT OFFICE.

JOHN S. ADRIANCE, OF NEW YORK, N. Y.

PROCESS OF DECOLORIZING TANNIN EXTRACT.

SPECIFICATION forming part of Letters Patent No. 571,635, dated November 17, 1896.

Application filed June 18, 1896. Serial No. 596,056. (No specimens.)

*To all whom it may concern:*

Be it known that I, JOHN S. ADRIANCE, of New York city, in the county and State of New York, have invented a new and Improved Process for Removing Coloring-Matter from Extracts Containing Tannin, of which the following is a full, clear, and exact description.

The object of the invention is to provide a means for treating extracts containing tannin, whereby the amount of coloring-matter contained in the said extracts may be economically decreased, so as to obtain a lighter shade in the finished extract and enabling leather to be given a much lighter color than ordinarily without detracting from its excellence when finished.

A further object of the invention is to provide a solution which may be used to advantage to remove coloring-matter from extracts containing tannin and adapted to be used as a mordant for the anilin colors, the said removal of the dark coloring-matter preventing the staining of cotton or other fabric, so that when the coloring-matter of the dye is taken up it will be bright and clear.

The invention consists in the steps of the process to be hereinafter more fully set forth and pointed out in the claims.

The water extract as it comes from the leaches is usually of the strength of 4° to 5° Twaddell. The temperature of this liquid runs from 120° to 212° Fahrenheit. The liquid is run into large settling-tanks holding usually about fourteen thousand gallons, and is there treated with a solution of basic acetate of lead. The said solution precipitates a large amount of coloring-matter, but only a small percentage of tannin. This basic acetate solution is preferably made up as follows: One hundred and forty pounds of acetate of lead and twenty-five pounds of litharge are added to one hundred and twenty-five gallons of water. These materials are boiled for about one-half an hour, or until all of said materials have gone into solution. The basic acetate solution is then added in small quantities at a time to the aforesaid liquid extracts containing the tannin. A precipiate is thereby formed which readily settles, containing the coloring-matter chemically and mechanically combined with lead. The extract containing the tannin combined with the basic-acetate solution is allowed to settle about twenty-four hours and the clear liquid is then drawn off and evaporated.

By this process the color of the finished extract is materially lightened, and when applied to leather will impart thereto a much lighter shade than is ordinarily obtained.

This process may be used with great advantage to remove the color from extracts containing tannin when employed as a mordant for the anilin colors, since by removing the dark coloring-matter in said mordant the staining of cotton or other fabric to which the coloring-matter is applied will be prevented and the coloring-matter that is taken up by the fabric, as heretofore stated, will be bright and clear.

Having thus described my invention, I claim as new and desire to secure by Letters Patent—

1. The herein-described process of removing coloring-matter from extracts containing tannin, which consists in subjecting the said extract to the action of a basic acetate-of-lead solution, whereby a precipitate will be formed containing portions of the coloring-matter mechanically and chemically combined with the lead, as and for the purpose specified.

2. The herein-described process of removing coloring-matter from extracts containing tannin, which consists in adding to the liquid extracts certain amounts of a basic acetate-of-lead solution, settling the coloring-matter in the extract thus treated, and finally drawing off the clear liquid, as and for the purpose set forth.

3. The herein-described process of treating liquid extracts containing tannin for the removal of the coloring-matter therefrom, the said process consisting in adding to the said liquid extracts a solution of basic acetate of lead to precipitate the coloring-matter, said solution consisting of acetate of lead, litharge and water, drawing off the clear liquid after the precipitated matters have settled, and finally evaporating the liquid thus freed from coloring-matter, whereby the color of the finished extract will be materially lightened, enabling leather to be given a very light shade without detracting from its quality, and preventing fabrics in which the finished extract is used as a mordant from being stained, as and for the purpose set forth.

JOHN S. ADRIANCE.

Witnesses:
J. FRED. ACKER,
JNO. M. RITTER.